United States Patent

Markowski et al.

[11] 3,930,370
[45] Jan. 6, 1976

[54] TURBOFAN ENGINE WITH AUGMENTED COMBUSTION CHAMBER USING VORBIX PRINCIPLE

[75] Inventors: Stanley J. Markowski; Richard S. Reilly, both of East Hartford, Conn.

[73] Assignee: United Technologies Corporation, Hartford, Conn.

[22] Filed: June 11, 1974

[21] Appl. No.: 478,403

[52] U.S. Cl. ............... 60/261; 60/262; 60/39.71
[51] Int. Cl.² ................. F02K 3/04; F02K 3/08
[58] Field of Search ........................ 60/262, 261

[56] References Cited
UNITED STATES PATENTS

| | | |
|---|---|---|
| 3,048,376 | 8/1962 | Howald et al. ............... 60/262 |
| 3,540,216 | 11/1970 | Quillevere et al. ............ 60/261 |
| 3,792,582 | 2/1974 | Markowski ................. 60/39.72 R |
| 3,800,527 | 4/1974 | Marshall et al. ............ 60/39.72 R |

Primary Examiner—John J. Vrablik
Assistant Examiner—Robert E. Garrett
Attorney, Agent, or Firm—Vernon F. Hauschild

[57] ABSTRACT

A mixed flow turbofan engine in which a portion of the core engine exhaust gases are passed into a pilot zone chamber where fuel is added thereto for vaporization therewith and wherein the fan air is passed over a series of vortex generators so that the vortex flow fan air and the vaporized fuel mixture will mix and combust rapidly in an augmentation combustion chamber.

29 Claims, 15 Drawing Figures

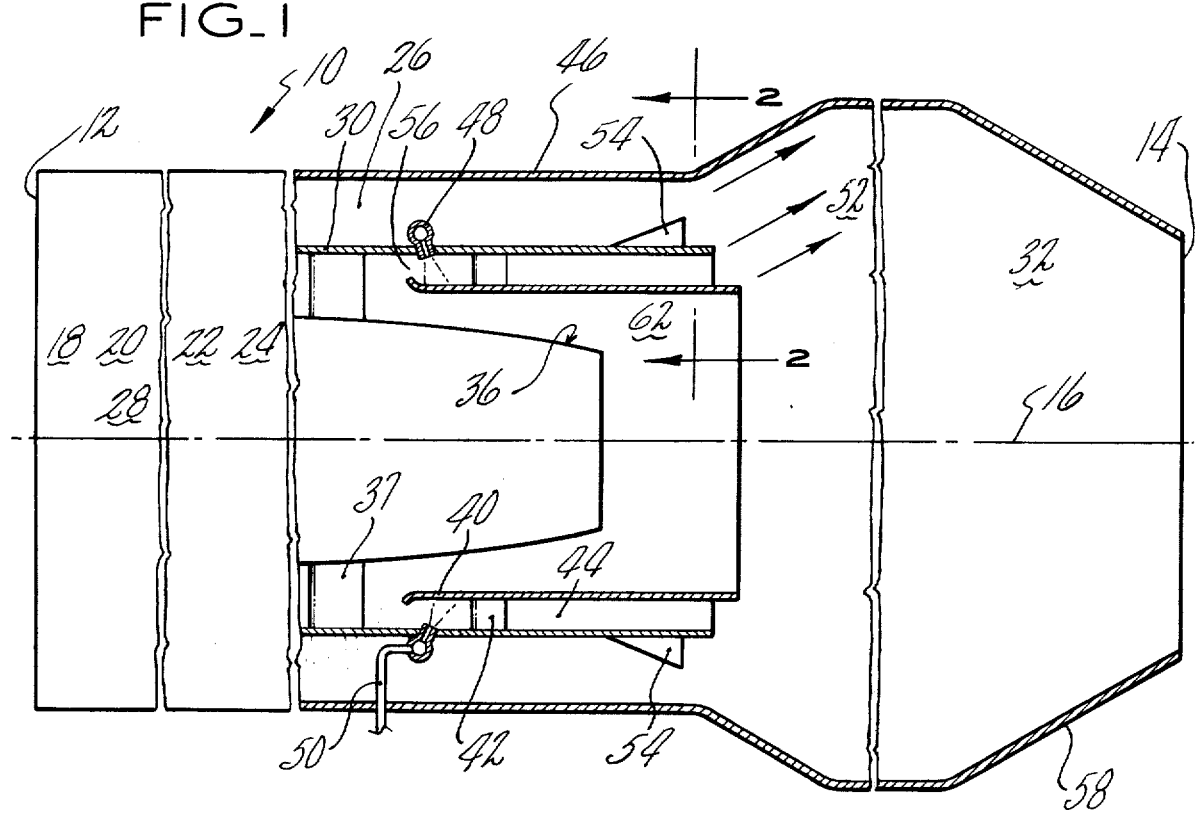

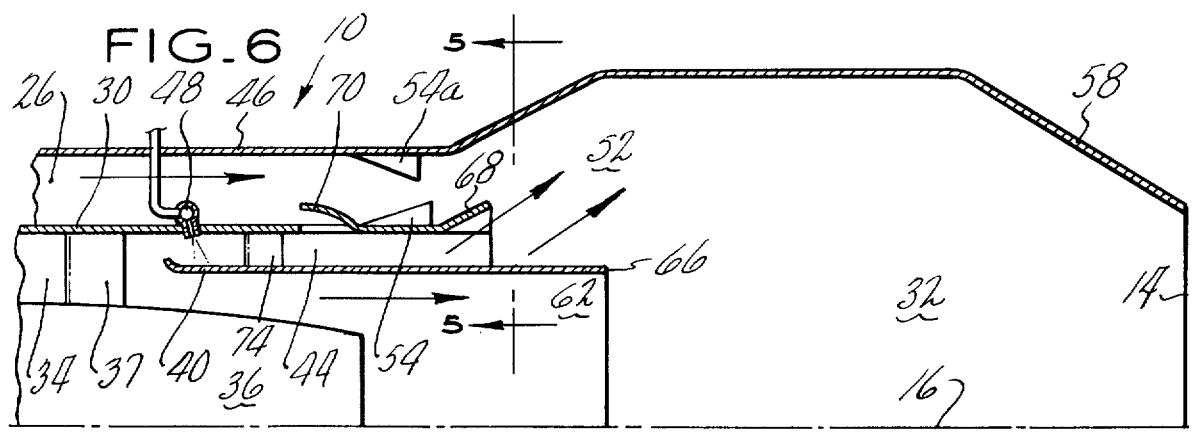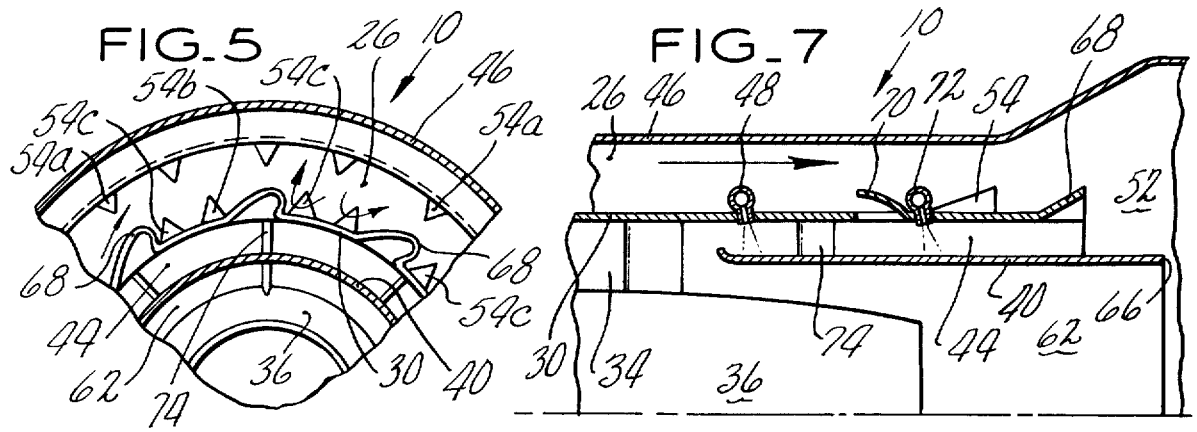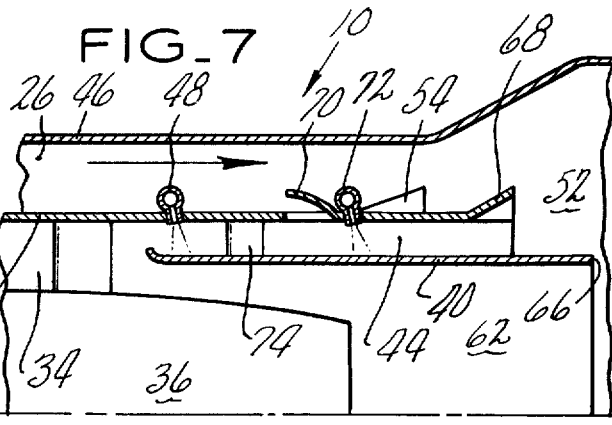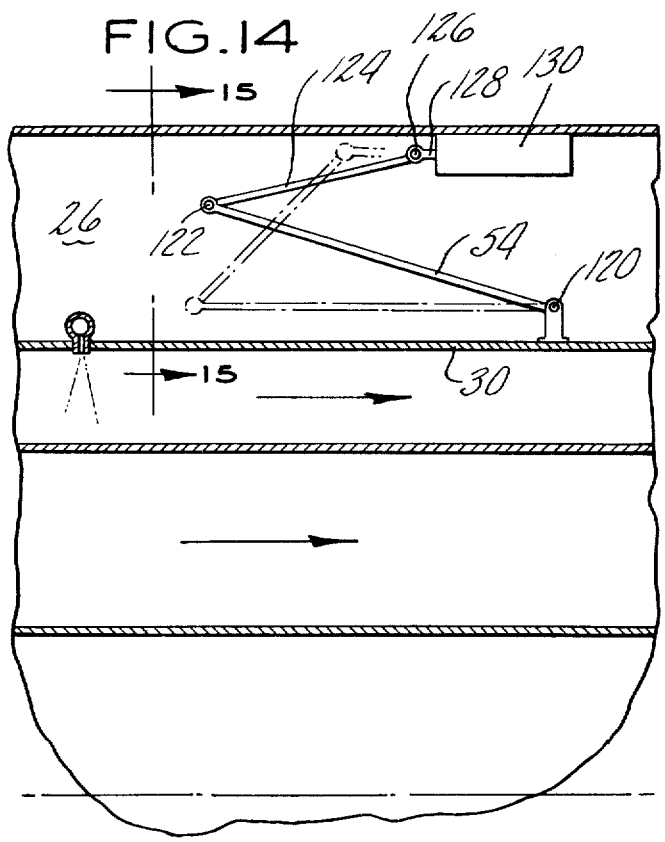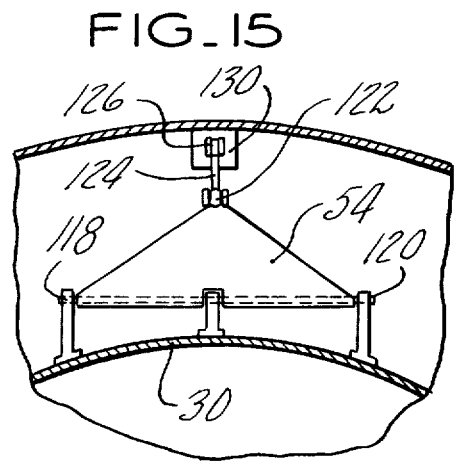

U.S. Patent    Jan. 6, 1976    Sheet 3 of 3    3,930,370
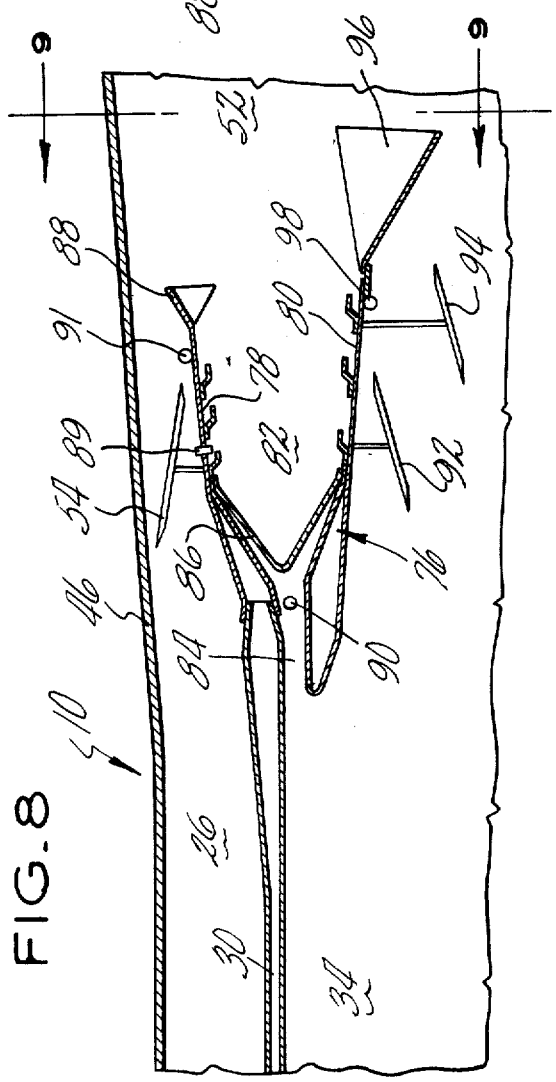
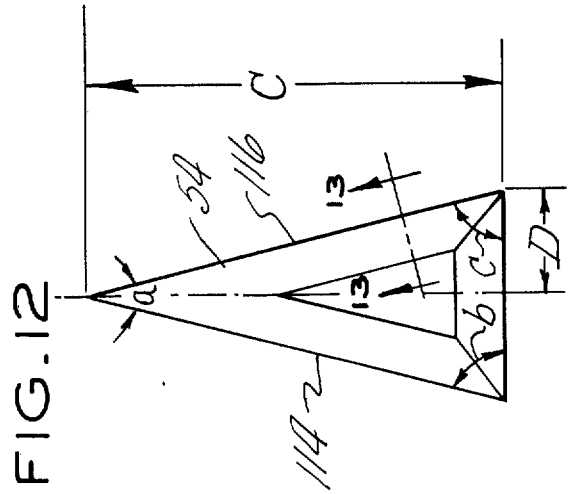
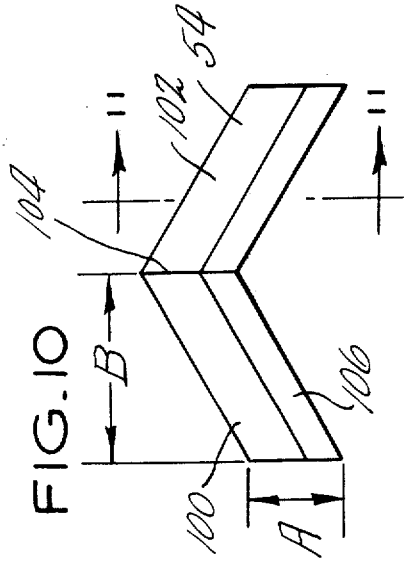

TURBOFAN ENGINE WITH AUGMENTED COMBUSTION CHAMBER USING VORBIX PRINCIPLE

BACKGROUND OF THE INVENTION

1. Field of Invention

This invention relates to augmentation burning in a mixed flow turbofan engine and more particularly to such a construction in which vorbix burning principles are used.

2. Description of the Prior Art

In the turbojet engine art, combustion takes place in the main combustion chamber between the compressor and the turbine of the engine and may also take place downstream of the turbine in the afterburner portion of the engine. In the early combustion art in turbojet engines, combustion was sustained in the main combustion chamber by establishing a recirculation zone as in Clark U.S. Pat. No. 2,525,206, Brown U.S. Pat. No. 2,676,460, and U.S. Pat. No. 2,560,207 to Berggren. In the afterburner art it was conventional to use flameholders of the type shown in U.S. Pat. No. 2,702,452.

From these types of combustion apparatus, the art advanced to the swirl burner principles taught in my U.S. Pat. Nos. 3,788,065 and 3,701,255, and divisions thereof, and to the vorbix burning principle taught in my pending U.S. patent application Ser. No. 406,771 filed October 15, 1973.

In turbofan engines of the mixed flow design in which fan air and the engine exhaust gases flow in a common exhaust duct, the engine cycle has a high temperature rise so that it is only practical to perform augmentation combustion in the fan air stream and by utilizing apparatus which produces minimum loss. Special and unique combustion problems are encountered in such augmentation combustion and the teaching herein is to sustain augmentation combustion in such a turbofan engine utilizing the vorbix burning principles.

SUMMARY OF THE INVENTION

A primary object of the present invention is to provide a mixed flow turbofan engine augmentation combustion system in which fuel is added to the core engine exhaust gas in a pilot zone chamber for vaporization therein and for mixing and autoigniting with the fan air which is passed over a plurality of vortex generators which cause a swirling motion of the fan air as it meets the vaporized fuel mixture for accelerated mixing and combustion therewith.

It is still a further object of the present invention to teach such a construction in which trigger mechanisms are used to accelerate mixing between the vaporized fuel mixture and the vortices of fan air.

In accordance with a further aspect of the present invention, the vortex generator pattern and the trigger shapes may be selected to effect optimum mixing and combustion.

In accordance with still a further aspect of the present invention and especially for installation in which the hot exhaust gas from the core engine will not completely vaporize the augmentation fuel sufficiently or added thrust is desired, a scoop system is provided to scoop some of the fan air into the pilot zone for autoignition therein or to have fuel added thereto for burning therein and for discharge therefrom as an autoignitable hot fuel-air mixture for combusting with the fan air vortices in the augmentation combustion chamber.

In accordance with a further aspect of the present invention, either the trigger mechanisms or the vortex generators may be retractable during the non-augmentation engine mode of operation.

Other objects and advantages of the present invention may be seen by referring to the following description and claims, read in conjunction with the accompanying drawings.

BRIEF DESCRIPTION OF THE DRAWINGS

FIG. 1 is a showing of a mixed flow turbofan engine, partially broken away to illustrate the augmentation combustion chamber utilizing vorbix principles.

FIG. 2 is a view taken along line 2—2 of FIG. 1.

FIG. 3 is a cross-sectional showing of the top half of the augmentation combustion chamber illustrating an alternative form of our invention.

FIG. 4 is a view taken along line 4—4 of FIG. 3.

FIG. 5 corresponds to FIG. 4 and illustrates an alternate vortex generator and trigger mechanism scheme.

FIG. 6 is a cross-sectional showing of the top half of such a turbofan engine utilizing still another alternative form of this invention.

FIG. 7 corresponds to FIG. 6 and illustrates still another modification of this invention.

FIG. 8 corresponds to FIG. 1 and shows a modified form of pilot zone construction.

FIG. 9 is a view taken along line 9—9 of FIG. 8.

FIG. 10 is a showing of a preferred form of vortex generator shaped as a swept wing.

FIG. 11 is a sectional view taken along line 11—11 of FIG. 10.

FIG. 12 is a showing of a delta wing shaped vortex generator.

FIG. 13 is a sectional view taken along line 13—13 of FIG. 12.

FIG. 14 is an illustration of a retractable vortex generator embodiment.

FIG. 15 is a view taken along line 15—15 of FIG. 14.

DESCRIPTION OF THE PREFERRED EMBODIMENT

Referring to FIG. 1 we see turbofan engine 10 which is of the mixed flow type in which fan air and the engine exhaust gases flow in a common exhaust duct. Engine 10 may be generally of the type more specifically described in U.S. Pat. No. 2,979,900 and includes inlet 12 and outlet 14 and is of generally circular cross section and concentric about engine axis 16. Engine 10 includes fan section 18, compressor section 20, main combustion section 22, turbine section 24 and augmentation combustion section 32. Fan section 18 includes fan blades which are mounted for rotation with the rotors of compressor 20 so as to pump fan air through annular passage 26. Compressor section 20, main burner section 22 and turbine section 24 form the core turbofan engine 28 which is enveloped within engine or splitter case 30. In conventional fashion, air enters inlet 12 and a portion of it is pumped by fan blades through fan passage 26 for discharge therefrom into augmentation burner section 32. The remainder of the air which enters inlet 12 passes through core engine 28 and is compressed in passing through compressor section 20, has heat added thereto in passing through main burner section 22, and then passes through turbine section 24, which extracts sufficient energy therefrom to drive compressor section 20 and fan section 18 before discharge from the core engine as exhaust gases through annular exhaust gas passage 34 and into the augmentation combustion chamber section 32. In conventional fashion, centerbody 36 may be located in engine case or splitter duct 30 or may be omitted. Turbine exit guide vanes 37 extend between case 30 and centerbody 36. Pilot zone case or duct 40 is supported within duct 30 in any conventional fashion, such as by streamlined struts 42, and cooperates therewith in defining annular pilot zone and passage 44 therebetween. Fan case 46 envelops engine case 30 and cooperates therewith to define annular fan passage 26 therebetween. Preferably, ducts or cases 46, 30 and 40 are of circular cross section and concentric about axis 16.

The turbofan engine 10 shown in FIG. 1 operates in such a fashion that the engine cycle has a high temperature rise so that it is only practical to augment the fan air stream entering augmentation section 32 through passage 26. Due to this high temperature rise, the products of combustion being discharged through exhaust gas passage 34 would have completely vitiated fuel-air therein and is therefore incapable of augmentation combustion at a downstream stage. Accordingly, it is an important teaching of our invention that the exhaust gas from core engine 28 be used in pilot zone 44 to vaporize the augmentation fuel being passed into zone 44 by conventional fuel atomizing ring 48, which is located at the forward or upstream end of pilot zone 44 to insure complete vaporization of the fuel therein and which receives fuel from fuel manifold 50.

The augmentation combustion taking place in engine 10 takes place in augmentation combustion chamber or zone 52, located immediately downstream of splitter duct 30 and utilizes the vorbix mixing and combusting principles. the vorbix principle of mixing and combustion is utilized in the FIG. 1 turbofan engine in the fashion now to be described. The fan air entering annular combustion zone 52 of augmentation combustion section 32 is caused to pass over a plurality of vortex generators 54, each of which may be shaped as a half-delta, which are position circumferentially about annular passage 26 and which are shown attached to the outer periphery of splitter case 30. Fan air, following passage over vortex generators 54 will enter combustion zone 52 in swirling flow as a series of vortices located circumferentially around zone 52 so as to quickly mix therein with the vaporized fuel being discharged annularly into zone 52 from pilot zone 44 for autoignition and combustion therewith in zone 52. The vaporized fuel is provided by causing some of the hot exhaust gases from core engine 28 to pass into the open inlet 56 of pilot zone 44 and to have fuel injected thereinto by fuel dispensing means 48 for vaporization in passing along pilot zone 44. Case 40 is chosen to be of sufficient axial length downstream of the fuel injection point that complete fuel vaporization can take place therewithin. Accordingly, the swirling fan air and the vaporized fuel are simultaneously injected into pilot combustion zone 52 for autoignition and combustion therein. In view of the swirling flow imparted to the fan air by vortex generators 54, accelerated mixing and combusting between the fan air and the vaporized fuel will take place following the vorbix principle since the product parameter $\rho_1 V_{1t}^2$ of the fan air will be greater than the corresponding product parameter $\rho_2 V_{2t}^2$ of the vaporized fuel to thereby bring about accelerated mixing and combustion. $\rho_1$ and $\rho_2$ are the densities of the fan air and vaporized fuel mixture, respectively, while $V_{1t}$ and $V_{2t}$ are the tangential velocities of the fan air and the vaporized fuel mixture, respectively.

The action of the vortex generators is illustrated in greater particularity in FIG. 2 from which it will be noted that the vortex generators 54 are of selected shape so that vortices of opposite rotation are established by adjacent vortex generators, such as 54' and 54''. Vortex generators 54 and trigger mechanism 60 may be of any conventional type such as those shown and described in my U.S. Pat. No. 3,788,065, but are preferably of the half-delta wing construction shown in FIG. 9. It will be noted by viewing FIG. 2 that the action of the vortex generators 54 is to cause the fan air to enter combustion zone 52 as a series of swirling flow streams, with adjacent streams rotating in opposite directions to further accelerate mixing following the vorbix principle. It would, of course, be possible to provide vortex generators 54 which would cause vortex flow in the same direction for all vortex generators and this would still be within the teaching of our invention. Because of the action of the augmentation combustion section 32, increased thrust is produced by turbofan engine 10 since the augmentation burning taking place in zone 52 adds energy to the core engine exhaust gases and the fan stream mixture before it is discharged in thrust generating fashion through outlet 14 of exhaust nozzle 58, which may be of a fixed or variable variety.

A modification of my turbofan augmentation combustion system is shown in FIG. 3 and is the same in all particulars as the construction illustrated and described in connection with FIG. 1 except for the modifications now to be described. Common reference numerals will be used where applicable. In the FIG. 3 construction, trigger or kicker mechanisms 60 are positioned at the downstream or after end of splitter duct 30 and are preferably in the shape of corrugations as best shown in FIG. 4, which corrugations are shaped to establish forced radial currents of hot, autoignitable vaporized fuel mixture from pilot zone 44 to flow radially outwardly into the fan air. Preferably, each trigger or convolution 60 is positioned between adjacent vortex generators 54 which generate oppositely rotating vortices of fan air on the opposite sides of the radially flowing hot vaporized fuel mixture stream from zone 44. While convolutions 60 are illustrated in the FIG. 3-4 embodiment at the downstream end of splitter duct 30 to form the kickers which generate the forced radial current of hot autoignitable vaporized mixture to flow into combustion chamber 52, it should be borne in mind that kickers 60 can be of a great variety of constructions, such as those disclosed in my U.S. Pat. No. 3,788,065 and will serve to produce the same desirable vorbix mixing and burning results.

Another modification of the FIG. 3-4 configuration over the FIG. 1-2 construction is that pilot duct 40 extends farther downstream than splitter duct 30 and this serves to insure that complete combustion takes place in augmentation combustion zone 52 before any dilution occurs to the fuel mixture from zone 52 with the core engine exhaust gases passing through passage 62 for mixing therewith downstream of outlet 66 of duct 40 and prior to discharge through thrust nozzle 58 and outlet 14.

While single rows of vortex generators have been shown in the FIG. 1-2 and 3-4 arrangements, other vortex generators and kicker arrangements could be utilized in either of these constructions, for example, as illustrated in FIG. 5. In the FIG. 5 construction, a first row vortex generators 54a are supported in the outer diameter portion of fan stream 26, preferably from fan case 46, and are shaped to generate vortices as illustrated to be rotating in the same direction. A second row of vortex generators 54b–54c is positioned at the inner diameter portion of fan air stream 26 and are preferably supported from splitter duct 30 and are preferably formed in vortex pairs as illustrated at 54b and 54c to generate vortices rotating in opposite directions on opposite sides of triggers 68. This multiple row vortex system of FIG. 5 is intended to accelerate the passage of the vaporized fuel from zone 44 across the fan air passage 26 so as to accelerate mixing and hence combustion in zone 52. It will further be noted in the FIG. 5 construction that the kickers or triggers 68 are canted convolutions in the downstream edge of splitter duct 54 and are preferably positioned between vortex generator pairs such as 54b and 54c. These convolutions are canted as shown to impart a rotary motion about axis 16 to the hot, autoignitable vaporized fuel mixture being discharged from zone 44 into the combustion zone 52. This rotational motion further utilizes the above described swirl flow or vorbix principle to accelerate mixing and combustion in addition to the vortex action generated by vortex generators 54.

Another embodiment of our invention is shown in FIG. 6 and is particularly applicable to a situation in which the core engine exhaust gases entering pilot zone 44 might not be sufficiently hot to insure complete fuel vaporization and hence autoignition of the fuel therein when mixed with the fan air in combustion zone 52. The FIG. 6 construction is also applicable where increased thrust augmentation is desired from augmentation combustion chamber 32. In the FIG. 6 construction, either a continuous scoop member 70 or a plurality of circumferentially spaced scoops 70 are positioned on splitter duct 30 and shaped to intercept some of the fan air from passage 26 and direct it into pilot zone 44 so as to effect autoignition and combustion of the fuel exhaust gas mixture in pilot zone 44 with some of the fan stream air to raise the temperature of the products of combustion being generated in pilot zone 44 to either increase the thrust being generated by engine 10 or to maintain the pilot discharge at a high enough temperature to autoignite upon contact with the fan air.

FIG. 7 illustrates a modification of the FIG. 6 embodiment in which fuel continues to be discharged into pilot zone 44 through fuel injection means 48 at the upstream end thereof, fan air continues to be introduced into pilot zone 44 through scoop or scoops 70, however, additional fuel is injected into zone 44 through fuel dispensing means 72, which may be a plurality of circumferentially positioned nozzles or apertures around splitter duct 30 so as to provide a staged fuel system. In such a system, maximum energy and hence thrust can be created if the engine exhaust gases are sufficiently hot to cause the autoignition of the fuel from injection system 48 at station 74, upstream of scoop system 70, and to also cause additional combustion at a station further downstream in the pilot zone 44 of the fuel from fuel system 72 with the fan air from scoop system 70 and the hot gases from zone 74.

A rear view of the FIG. 6 and FIG. 7 constructions would be the same as shown in FIG. 4.

Although the arrangements shown in FIGS. 1, 3, 6 and 7 constructions would serve to accelerate mixing between the fan air and the core engine exhaust gases, even during the nonaugmented mode of operation in which augmented combustion system 32 is not supporting combustion in combustion zone 52, there may be installations where it is deemed desirable to retract the vortex generators 54, the trigger mechanisms 60 and the scoop mechanism 70 during the nonaugmented mode of operation.

Referring to FIGS. 8 and 9, we see a modified form of our invention in which pilot zone defining means 76 is connected to the downstream end of case 30 and includes an outer wall 78 and an inner wall 80, each of which are of circular cross section and concentric about axis 16 so as to define annular pilot zone 82 therebetween. Pilot zone means 76 is shaped so that its annular inlet 84 communicates with passage 34 to receive the engine exhaust gases therefrom for passage through perforated plate member 86 into pilot zone 82. A plurality of vortex generators 54 are positioned circumferentially about passage 26 and are preferably individually supported from wall 78. A trigger mechanism 88, which is preferably a corrugated ring, is connected to the downstream end of wall 78. Pilot fuel is injected around annular inlet 84 through pilot fuel injection means 90 for mixing with the hot products of combustion and is vaporized thereby in pilot zone 82 so as to form a vaporized fuel mixture for discharge therefrom into augmentation burner 52 as radially projecting columns of autoignitable, vaporized fuel mixture for accelerated mixing and burning with the vortices of fan air being discharged into augmentation burner 52 due to the action of vortex generators 54 in fan passage 26. As best shown in FIG. 9, preferably the vortex generators 54 are positioned between adjacent corrugations in trigger mechanism 88.

In practice, the FIG. 8–9 construction will operate precisely as the previously described constructions when they include the mechanism just described. To be specific, the core engine products of combustion enter pilot zone inlet 84 for mixing therein with pilot fuel from mechanism 90 to thereby vaporize the fuel and discharge it into augmentation burner zone 52 through trigger mechanisms 88 for autoignition and accelerated mixing and combustion with the fan air vortices being passed into burner zone 52 from the fan stream 26, due to the action of the vortex generators 54.

With the FIG. 8–9 construction, secondary fuel may be injected into the fan stream and annularly thereabout by secondary fuel injection mechanism 91, if greater heat or thrust generation is desired.

In addition, in mixed flow turbofan engines in which the engine exhaust gases are not completely vitiated of fuel, one or more rows of vortex generators 92 and 94 may be positioned circumferentially about passage 34, and are preferably suspended from inner wall 80, which has trigger mechanism 96, in the form of a corrugated ring extending circumferentially thereabout. With this construction, the products of combustion from passage 34, which may include unvitiated fuel, or which may have fuel injected annularly thereinto through fuel dispensing means 98, is discharged into augmentation burner 52 as a circumferentially spaced plurality of vortices of a fuel-rich mixture of core engine exhaust gases due to the action of vortex generators 92 and 94. The fuel-rich vortices of fuel-rich exhaust gases autoignite, rapidly mix and combust with vaporized fuel mixture which enters augmentation burner zone 52 through trigger mechanism 96 as a series of radially moving columns of hot, autoignitable, vaporized fuel mixture. Again, as best shown in FIG. 9, vortex generators 92 and 94 are preferably positioned between the corrugations of trigger mechanism 96. While a double row of vortex generators 92 and 94 is shown in the FIG. 8 environment, a single row could have been used. In addition, while secondary fuel injection means 98 is shown in the FIG. 8 environment, in fan engines which operate so that there is fuel remaining in the exhaust gases from the core engine, this secondary fuel injection apparatus would not have been necessary.

Triggers 88 and 96 may be of any of the types previously described.

While pilot zone mechanism 76 is described in the FIG. 8-9 embodiment as a fuel-vaporizing pilot to produce an autoignitable, vaporized fuel mixture, it will be evident to those skilled in the art that pilot 76 could be of the variety in which pilot fuel from supply 90 is burned in zone 82 to produce a continuous pilot flame for ignitable mixture passing through the fan and/or core engine passages 26 and 34.

To this point, the operation of the FIG. 8-9 modification has been described in generalities and the preferred embodiment and its method of operation will now be described. When the FIG. 8-9 modification is used with a turbofan engine in which all oxygen has not been consumed in the engine exhaust gas stream in passage 34, pilot fuel is introduced at 90, passes through perforated flameholder 86, and burns in pilot chamber 82, where it is ignited either by autoignition or, if necessary, by a conventional ignitor 89. Secondary fuel is introduced at stations 91 and 98 from which it is injected into the hot pilot gases issuing from pilot combustion region 82 to thereby accomplish rapid vaporization of the secondary flow from stations 91 and 98. The resulting autoignitable fuel-rich mixture mixes and burns with the fan air vortices caused by vortex generators 54 and the engine exhaust gas vortices caused by vortex generators 92 and 94. Using this construction and method of operation, thrust variation is smooth and continuous from the lowest level of augmentation when pilot fuel 90 only is burned, through various increased thrust levels as the secondary fuel 91 and 98 are introduced and burned as required in increasing proportions to produce the desired overall thrust level.

Further, when the FIG. 8 and 9 preferred embodiment is used in an engine in which all oxygen is used up in the core engine exhaust gas stream passing through passage 34, these exhaust gases are, in and of themselves, very hot and the burning of pilot fuel 90 therewith is not necessary to produce an autoignitable mixture when mixed with the fan air. In such an engine construction, secondary fuel is injected directly from stations such as 91 and 98 into pilot region 82 to form a hot, fuel-rich and autoignitable mixture with the engine exhaust gases in region 82 and for discharge therefrom and accelerated mixing and burning with the fan air vortices generated by airfoils 54. In such a construction, the core engine airfoil generators 92 and 94 may be used to serve a mixing function downstream thereof or may be omitted.

The vortex generators illustrated in the various embodiments already described may be of the swept wing variety shown in FIG. 10 and 11, in which the vortex generator, such as 54, consists of two wing sections 100 and 102, which are joined at station 104 and sweep back therefrom at an angle of about 30° on each side thereof, and taper at their afterends 106 to define an angle of about 20°. While other dimensions will suffice for different embodiments, we have found that the thickness T of FIG. 10-11 swept wing vortex generator should be about 0.125 inch, the dimension A thereof shown in FIG. 10 should be about 1.410 inches, and the dimension B thereof shown in FIG. 10 should be about 2.815 inches.

The vortex generators shown in the several embodiments previously described might also be of the delta wing shape shown in FIGS. 12 and 13. The vortex generator 54 so illustrated is of the sharp edge variety in which, as best shown in FIG. 13, the edge of the generator 54 throughout its periphery is machined so that it has a flat surface 108, spaced from parallel flat surface 110, which are joined by an inclined surface 112, forming an angle with the perpendicular of about 83° ± 1° as illustrated or, defining an included angle of about 7° ± 1°. The angle formed by side sharp surfaces 114 and 116 of the delta wing vortex generator is about 76° ± 1° with the perpendicular so as to define an angle of $a$ therebetween of about 28° ± 2°. Angles $b$ and $c$ are equal. While other dimensions will suffice for other embodiments, we have found that our delta wing generators perform well when the dimension C of FIG. 12 is 6.850 inches and the dimension D of FIG. 12 is 1.720 inches.

As previously mentioned, the vortex generators 54, or any of the other vortex generators for trigger mechanisms, may be retractable. An embodiment of such a configuration is shown in FIGS. 14 and 15 wherein delta shaped vortex generators 54 is pivotally connected to case 30 at pivot points 118 and 120 and is pivotally connected at its third corner to one end 122 of link 124 which is, in turn, pivotally connected at its opposite end 126 to piston arm 128 of conventional cylinder-piston actuator 130, which may be hydraulically or pneumatically actuated or which may, in fact, be an electric motor or any other prime mover. With the FIG. 14-15 construction, it will be noted that with arm 128 extended, vortex generator 54 is in its phantom line retracted position to offer minimum resistance to fan air flow through passage 26, and that when arm 128 is withdrawn to its fully withdrawn position, the vortex generator 54 is in the solid line position to form vortices from the tips thereof for passage into combustion zone 52 as a series of circumferentially positioned vortices of fan air.

We wish it to be understood that we do not desire to be limited to the exact details of construction shown and described, for obvious modifications will occur to a person skilled in the art.

We claim:

1. A mixed flow turbofan engine having an inlet and an outlet and having:
   A. a core engine enveloped within an engine case having an inlet and an outlet and being of circular cross section and concentric about the engine axis and mounted to define a first passage through which core engine exhaust gases are passed,
   B. a fan section enveloped within a fan case having an inlet and an outlet and being of circular cross section and which envelops and is concentric with said engine case to define a first annular passage therebetween through which fan air is passed and which extends downstream of the engine case to define an augmentation burner therewithin,
   C. a pilot zone case having an inlet and an outlet and being of circular cross section and concentric about the engine axis and supported within the engine case with its inlet located at an axial station upstream of the engine case outlet so that the fan case, the engine case and the pilot zone case cooperate to define an annular pilot combustion zone between the fan and pilot cases and downstream of the engine case, and which pilot zone case defines a second annular passage with the engine case in the form of an annular pilot zone having an open upstream end to receive therein exhaust gases from the core engine, D. means to introduce fuel into said pilot zone for mixing therein with the exhaust gases of the core engine and for discharge therefrom at the engine case outlet for mixing and combustion with the fan air, and E. a plurality of vortex generators positioned within the first annular passage and located circumferentially thereabout to cause the fan air to be discharged from said first annular passage and into the pilot combustion zone as a plurality of vortices to thereby accelerate mixing and combustion with said fuel from said pilot combustion chamber.

2. A turbofan engine according to claim 1 and including trigger mechanism located circumferentially about the outlet of said engine case and shaped to generate forced radial currents of hot autoignitable vaporized mixture from the pilot zone to accelerate mixing and burning between the vaporized mixture and the fan air in the pilot combustion zone.

3. A turbofan engine according to claim 1 wherein said vortex generators are shaped so that adjacent generators generate fan air vortices rotating in opposite directions and including trigger mechanisms located circumferentially about the outlet of said engine case and positioned between adjacent vortex generators and shaped to generate a forced radial current of hot autoignitable vaporized mixture from the pilot zone to accelerate mixing and burning between the vaporized mixture and the fan air in the pilot combustion zone.

4. A turbofan engine according to claim 3 wherein said trigger mechanism consists of radially outwardly extending convolutions in said engine case and terminating in a maximum radial amplitude station at the engine case outlet.

5. A turbofan engine according to claim 4 wherein said vortex generators comprise:

A. a first circumferentially extending row of vortex generators formed as vortex generator pairs which are shaped to generate vortices in opposite directions, and B. a second row of vortex generators positioned radially outwardly thereof and shaped to generate vortices rotating in the same direction and each positioned to be radially outwardly of one of the trigger mechanism convolutions or a vortex generator pair from the first row and wherein said convolutions are canted circumferentially.

6. A turbofan engine according to claim 1 and including air scoop means positioned circumferentially about said engine case at a station axially downstream of said fuel introducing means and shaped to communicate with the pilot zone and to extend into said first annular passage to intercept selected quantities of fan air and direct them into the pilot zone.

7. A turbofan engine according to claim 6 and including means to introduce fuel into said pilot zone at a station downstream of said air scoop means.

8. A turbofan engine according to claim 7 wherein said fuel injection means is positioned a sufficient distance from the engine case outlet so that fuel injected therethrough is either fully vaporized or fully burned before being discharged into said pilot combustion zone.

9. A turbofan engine according to claim 6 wherein said scoop members are retractable.

10. A turbofan engine according to claim 1 wherein said vortex generators are retractable.

11. A turbofan engine according to claim 1 wherein said vortex generators are of half-delta shape.

12. A turbofan engine according to claim 1 wherein said pilot burner case inlet is located a sufficient distance axially upstream of the engine case outlet and wherein the fuel introducing means is located a sufficient distance axially upstream of the engine case outlet that the fuel introduced to the pilot combustion chamber is mixed therein with the exhaust gases of the core engine and fully vaporized before discharge therefrom so as to autoignite upon contact with the fan air in the pilot combustion zone.

13. A turbofan engine according to claim 1 wherein the outlet of the engine case is positioned a selected distance axially forward of the outlet of the pilot case so that complete combustion occurs in the pilot combustion zone before mixing and dilution with the core engine exhaust gases passing through the pilot case outlet.

14. An engine according to claim 1 wherein said vortex generators are of swept wing shape.

15. An engine according to claim 1 wherein said vortex generators are of delta wing shape.

16. An engine according to claim 2 wherein said vortex generators are of swept wing shape.

17. An engine according to claim 2 wherein said vortex generators are of delta wing shape.

18. A mixed flow turbofan engine having an inlet and an outlet and having:

A. a core engine enveloped within an engine case having an inlet and an outlet and being of circular cross section and concentric about the engine axis and mounted to define a first passage through which core engine exhaust gases are passed, B. a fan section enveloped within a fan case having an inlet and an outlet and being of circular cross section and which envelops and is concentric with said engine case to define a first annular passage therebetween through which fan air is passed and which extends downstream of the engine case to define an augmentation burner therewithin, c. an annular pilot zone chamber having an inlet communicating with the first passage and an outlet communicating with the augmentation burner so that the inlet of said annular pilot zone chamber receives engine exhaust gases from said first passage and having:

1. an outer wall adjacent said first annular passage, 2. an inner wall adjacent said first passage and cooperating with said outer wall to define an annular pilot zone therebetween, and 3. means to inject pilot fuel into said pilot zone to be vaporized therein by the engine exhaust gases for discharge therefrom as a hot, autoignitable vaporized fuel mixture, and D. a plurality of vortex generators positioned within said first annular passage and located circumferentially thereabout adjacent said pilot burner outer wall to cause the fan air to be discharged from said first annular passage thereover and into said augmentation burner as a plurality of vortices to thereby accelerate mixing and combustion therein between said fan air and said hot, autoignitable, vaporized fuel mixture.

19. An engine according to claim 18 and including trigger mechanism located circumferentially about the outlet into pilot zone chamber outer wall and shaped to generate forced radial currents of said pilot zone mixture across said first annular passage to cooperate with the fan air vortices to accelerate mixing and burning between the pilot zone mixture and the fan air.

20. An engine according to claim 19 and including means to inject fuel into said first annular passage so that a fan air-fuel mixture is discharged into the augmentation burner as vortices.

21. An engine according to claim 19 and including:
A. means to discharge fuel into said first passage to mix with said core engine exhaust gases to produce a fuel rich mixture of engine exhaust gases, and
B. a plurality of vortex generators positioned within said first passage and located circumferentially thereabout adjacent the pilot zone chamber inner wall to cause the fuel rich engine exhaust gases to be discharged from the first passage and into the augmentation burner as a plurality of vortices to thereby accelerate mixing and combustion between said pilot zone mixture and said core engine fuel rich exhaust gas mixture in said augmentation burner.

22. An engine according to claim 21 and including trigger mechanism located circumferentially about the outlet into pilot zone chamber inner wall and shaped to generate forced radial currents of said pilot zone mixture across said first passage to cooperate with the fuel rich mixture of engine exhaust gas vortices to accelerate mixing and burning between the pilot zone mixture and the fuel rich mixture of engine exhaust gas.

23. An engine according to claim 21 and including means to inject fuel into said first annular passage so that a fan air-fuel mixture is discharged into the augmentation burner as vortices and wherein said fuel injection means for said first annular passage and said first passage are located adjacent the vortex generator pluralities in those passages.

24. An engine according to claim 23 wherein said trigger mechanisms are axially displaced.

25. An engine according to claim 21 wherein said vortex generators are swept wing shaped.

26. An engine according to claim 21 wherein said vortex generators are delta wing shaped.

27. An engine according to claim 21 wherein the trigger mechanisms are corrugated rings connected to the outlet of the inner and outer walls of the pilot zone chamber and shaped so that the maximum amplitude of the corrugation is at the trigger mechanism farthest downstream station, and wherein the vortex generators of each plurality are positioned between corrugations.

28. An engine according to claim 18 wherein said vortex generators are retractable.

29. In a mixed flow turbofan engine, augmentation combustion apparatus having an axis and an inlet end and an outlet end and including:
A. a first case having an inlet and an outlet and being of substantially circular cross section and positioned concentrically about the axis to define a first passage therewithin,
B. a second case having an inlet and an outlet and being of substantially circular cross section and concentric about said axis and enveloping said first case to define a first annular passage therebetween and extending downstream of the first case outlet,
C. a third case member having an inlet and an outlet and being of substantially circular cross section and concentric about said axis and positioned within said first case member to define a second annular passage therebetween and extending a selected distance axially of the first case outlet to define an annular pilot zone therebetween and shaped to cooperate with said first and second cases to define an annular augmentation combustion chamber,
D. means to pass air through said first annular passage,
E. a plurality of vortex generators positioned in said first annular passage and located circumferentially therearound to cause the air being passed through said first annular passage to enter said combustion chamber as a series of circumferentially spaced vortices,
F. means to pass heated gas through said first passage and said second annular passage,
G. means to inject fuel into said second annular passage a sufficient distance upstream of said first case outlet so that said fuel will mix with and be vaporized by said hot gas before being discharged into said combustion chamber for rapid mixing and combusting with said vortices of air therein, and
H. wherein said first case is the core engine case, wherein said second case is the fan case and wherein the third case is a pilot zone case, wherein said air is fan air, and wherein said hot gas is core engine exhaust gas.

* * * * *